United States Patent [19]

Koller et al.

[11] Patent Number: 4,492,961
[45] Date of Patent: Jan. 8, 1985

[54] SYSTEM FOR DERIVING PRECISE INSTANTS OF TRIGGERING OF A PULSED DEVICE

[75] Inventors: Wilhelm J. Koller, Brunswick; Horst Vogel, Korntal, both of Fed. Rep. of Germany

[73] Assignee: International Standard Electric Corporation, New York, N.Y.

[21] Appl. No.: 507,372

[22] Filed: Jun. 24, 1983

Related U.S. Application Data

[63] Continuation of Ser. No. 241,603, Mar. 9, 1981, abandoned.

[30] Foreign Application Priority Data

Mar. 13, 1980 [DE] Fed. Rep. of Germany ....... 3009651

[51] Int. Cl.$^3$ .......................... G01S 13/70; G01S 7/40
[52] U.S. Cl. ..................................... 343/7.3; 343/17.7
[58] Field of Search ................................ 343/7.3, 17.7

[56] References Cited

U.S. PATENT DOCUMENTS

| | | | |
|---|---|---|---|
| 3,934,251 | 1/1976 | Spratt | 343/7.3 X |
| 4,138,678 | 2/1979 | Kirner | 343/17.7 |
| 4,395,712 | 7/1983 | O'Hare | 343/7.3 |

*Primary Examiner*—T. H. Tubbesing
*Attorney, Agent, or Firm*—T. L. Peterson; A. D. Stolzy

[57] ABSTRACT

A system for correcting the time of occurrence of a triggering point along the rise time of a pulse, particularly in a DME system comprising interrogator and transponder stations. Actual received pulses which may be distorted by multipath signals or other effects are compared with stored rise time reference values to generate corrections to time correct the triggering point. The correction may be transmitted between interrogator and transponder in coded form.

1 Claim, 3 Drawing Figures

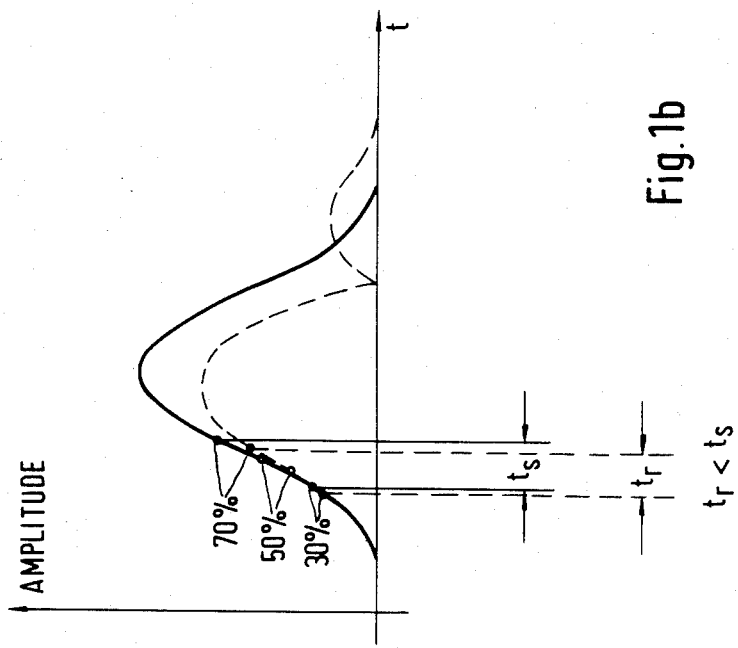
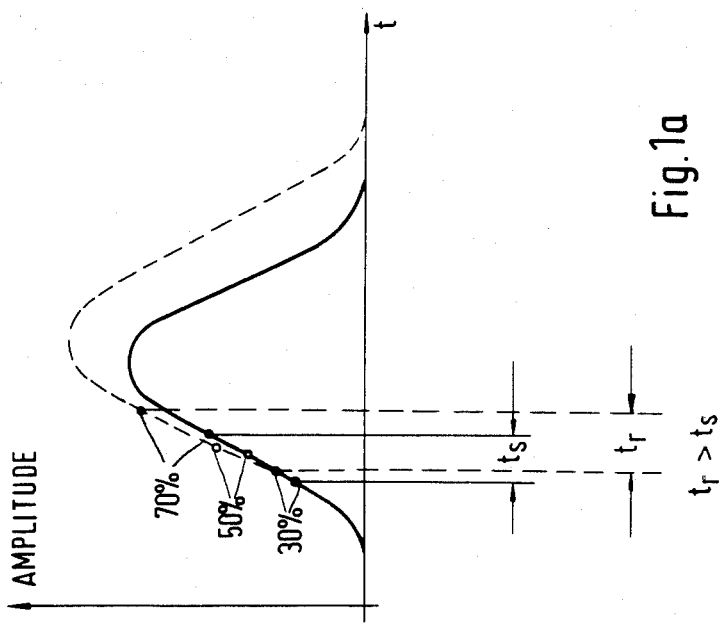

SYSTEM FOR DERIVING PRECISE INSTANTS OF TRIGGERING OF A PULSED DEVICE

This is a continuation of application Ser. No. 06/241,603 filed Mar. 9, 1981 now abandoned.

BACKGROUND OF THE INVENTION

1. Field of the Invention

The invention relates to precise pulse triggering means, particularly in the so-called DME (Distance Measuring Equipment).

2. Description of the Prior Art

The precise triggering of an electronic function is frequently necessary, and in DME the accuracy of range measurement is dependent upon precise triggering time. A DME system of the type is described in the text "Funksysteme fur Ortung und Navigation" by E. Kramar (Verlog Berliner Union GMBH, Stuttgart 1973), Pages 147 to 149.

The instant of triggering in a DME receiver is generally the point of time at which the first pulse of a DME pulse pair is half its maximum value. The following considerations refer only to the first DME pulse.

It frequently happens that the DME interrogation pulse (or reply pulse) reaches the DME transponder (or interrogator) not only by the direct path but is reflected from one or more obstacles and thus arrives at the DME transponder (or interrogator) also by an indirect path. The direct signals and the indirect signals are then superimposed on each other, and a pulse is obtained whose shape differs from that prescribed. If the instant of triggering continues to be derived in the manner described, an error will result caused by this multipath propagation.

SUMMARY OF THE INVENTION

The general objective of the invention may be said to be provision of a system of the above kind in which multipath errors are reduced.

The novel solution according to the invention for precisely determining the instant of triggering is particularly suitable fo use in DME. In that application, the benefits of the invention include reduction of multipath errors, wider transmitted pulse tolerance (permitting simpler transmitter implementation) and reduced sensitivity to distortions during signal processing.

According to one aspect of the invention, not only multipath errors (due to pulse distortions) are reduced, but also those errors (pulse distortions) which result from the fact that the transmitted pulse do not have the prescribed form, or which are caused by the limited bandwidths of the RF modules.

The tolerance of the pulse shape need no longer meet such stringent requirements, so that even high-accuracy DME equipment can be built with simple and low-cost transmitters. The error reduction provided by the invention is also effective even when no multipath errors are present.

BRIEF DESCRIPTION OF THE DRAWINGS

The invention will be described in detail with reference to the accompanying drawings, in which:

FIGS. 1a and 1b show pulse waveforms for explaining the invention.

DETAILED DESCRIPTION OF THE DRAWINGS

Figure 2:
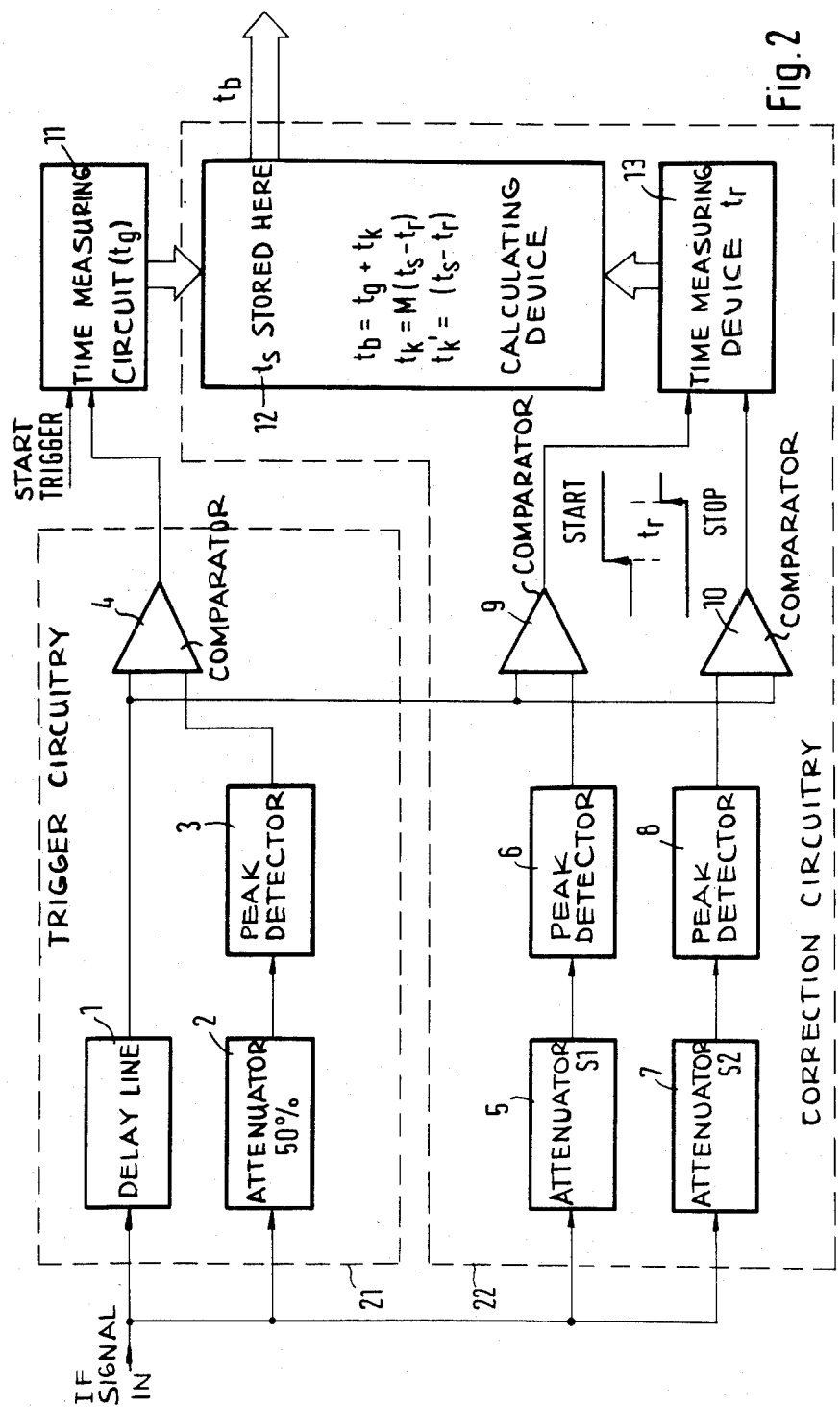
FIG. 2 is a block diagram of part of a DME interrogator including the invention.

The invention will be explained as applied to a DME system.

In the DME interrogator, which is normally aboard an aircraft, a DME interrogation signal is produced and radiated, consisting of a pair of pulses. High distance measurement accuracy is achieved if the envelopes of the pulses are asymmetric ($cos^2$ shaped) curves, however, such an envelope waveform is not a prerequisite for the novel triggering technique.

In the DME interrogator, a first trigger signal is produced when the first pulse of the transmitted pulse pair reaches half its maximum value. A second trigger signal is produced when the first pulse of the pulse pair of the DME reply signal received from a DME transponder reaches half its maximum value. The time $t_g$ between these two trigger signals is proportional to the the distance between the DME interrogator and the DME transponder in a known manner.

The time $t_g$ includes the signal transit time between the two stations and the built-in equipment delays, these normally being taken into account in the distance measurement instrumentation, but those effects will not be dealt with here. For the invention, it is only important to know that the accuracy of the distance measurement strongly depends on the precise determination of the instants of triggering (i.e. the time along transmitted and received pulse leading edges which is taken as the effective pulse time). In the following description, the second pulse of a DME pulse pair is ignored because it is of no importance to the distance evaluation in the embodiment described, although it does have an identification function in DME operation. The invention will be explained as applied to an airborne DME station, however, it should be understood that the invention also applies to the DME ground station. In the airborne DME station a correction of the time $t_g$ is performed, in the DME ground station the correcting value is used to control the time between the reception of a DME interrogation signal and the transmission of a DME reply signal in such a way that the reply signal is transmitted at the correct instant.

As previously indicated, the interrogator and transponder signals not only travel by the direct paths but may also be reflected from various obstacles and thus reach the other station by indirect paths. In that case, the received signal consists of a composite of the direct signal (i.e., the signal having travelled to the other station by the direct path) and those indirect signals. It is apparent that the resulting received signal will no longer have its original shape.

In FIG. 1a, the signal that would be received without undesired reflections is shown by a solid line, while the actually received composite signal including multipath contributions is shown by a dashed line.

It was assumed in FIG. 1a that the electrical phase difference between the radio-frequency carrier waves of the signals superimposed on each other is 0°. As mentioned earlier, a trigger signal is produced when half the maximum amplitude is reached (other triggering techniques are of course also possible). In the dashed line waveform produced by superposition, amplitude is greater, and the trigger signal is consequently produced later (compared to the case where only the direct signal is present). This results in a measurement error which, however, can be eliminated in a particularly advantageous manner.

FIG. 1a shows not only the instants at which the composite pulse and the direct pulse attain half their maximum amplitudes (50%) but also the instants these pulses attain 30% and 70% of their maximum amplitudes. If the rise time is defined as the time required for the pulse to rise from the 30% point to the 70% point, the rise time $t_s$ of the direct pulse is shorter than the rise time $t_r$ of the real case (composite) pulse. The difference between the composite rist time $t_r$ and the reference rise time $t_s$ is used to advantage to produce a correcting value.

The reference rise time $t_s$ is known a priori and is stored in the airborne station. The actual rise time $t_r$ is measured, and the difference $t_{k'} = t_s - t_r$ is calculated. However, the value $t_{k'}$ is only a measure of the deviation of the actual instant of triggering from the desired instant of triggering, not the deviation itself. Consequently, the difference $t_{k'}$ must be multiplied by a factor M to obtain the desired correcting value $t_k = M \times t_{k'}$. M depends on the pulse shape, the choice of the threshold values (in the present case 30% and 70%), and the value $t_{k'}$. It is possible to arrange the values $t_{k'}$ in different, e.g. four, ranges of values, and to assign a value M to each range of values. With a $\cos^2$-shaped envelope and at threshold values of 20% and 50%, M may be chosen to be 3.3.

For distance evaluation, the measured time $t_g$ is corrected by the value $t_k$, and for further distance determination, which is carried out in the known manner, the corrected value $t_b$ is used.

$$t_b = t_g + t_k$$

FIG. 1b, like FIG. 1a, shows a pulse (solid line) having arrived by the direct path, and a composite pulse (dashed line) formed by superposition.

Unlike in FIG. 1a, however, it is assumed that the radio-frequency carrier waves of the pulses superimposed on each other (dashed line of FIG. 2) are 180° out of phase with respect to each other. Otherwise, the description relating to FIG. 1a applies equally to FIG. 1b.

To determine the correction, the rise time difference between two threshold values is evaluated. Alternatively, time differences over the entire amplitude characteristic, a given portion of the amplitude characteristic, or other typical pulse-determining parameters can be used to determine the correcting value. In all these cases, the received pulse is compared with the reference pulse or parts of typical parameters thereof.

Since the pulses transmitted by DME equipment very seldom reach the predetermined ideal shape because of permissible variations and distortions caused during the processing of the pulse, it is possible to further improve the determination of the correcting value $t_k$ in a particularly advantageous manner. It is again assumed that the rise times are used for the comparison.

So far it was assumed that a fixed reference value is stored in the DME interrogator. However, this value does not always agree with the corresponding value of the direct pulse, because the rise time of this pulse, for example, may vary within certain tolerance limits, too. This applies to the pulses of both the interrogation signal and the reply signal.

If the correction is to be made in the interrogator, the rise time of the direct pulse transmitted by the transponder must be known in the interrogator as exactly as possible.

Therefore, the rise time is determined in the transponder and transmitted in digital form to the interrogator. This digital data can be transmitted in various ways, which are known per se. One possibility is described in a publication by Standard Elektrik Lorenz AG entitled "DME-gestutztes Landesystem DLS", Stuttgart, 1975. Also, the transmitter and receiver described there can be used to implement the present invention. The rise time of the pulse can be determined in the ground station as described hereinafter (explained for the interrogator with the aid of FIG. 2). The precise rise time of the DME pulse transmitted by the transponder, which time is known in the interrogator, is stored until new values are transmitted from the transponder.

The rise time of the DME interrogation pulse transmitted by the interrogator can be determined in the same manner in the interrogator, transmitted to the transponder, and used there as a reference value. The transmission of the digitized shape of the transmitted pulse to the respective other station permits an extension of the pulse shape tolerances because in the respective other station a correcting value can be calculated from the comparison of the transmitted pulse shape with the reference pulse shape.

Compared to the first-described solution, in which the reference value is a fixed value, an improvement is also achieved if the reference value used in the interrogator is a value derived from the interrogator's own interrogation pulse (e.g., the rise time). This results in an error during the derivation of the instant of triggering, both in the interrogator and in the transponder. Advantageously, however, the correcting value in the interrogator has a sign opposite to that in the transponder, so that these errors cancel out. This will be explained by a simple example:

|  | Nominal value | Interrogation pulse | Reply pulse |
| --- | --- | --- | --- |
| Rise time between two preset threshold values | 500 ns | 478 ns | 542 ns |

Comparison in the transponder:
(a) $t_{k'} = 542$ ns $- 478$ ns $= 64$ ns
If the instant of triggering is corrected by this value, the reply pulse will be transmitted too late.
Comparison in the interrogator:
(b) $t_{k'} = 478$ ns $- 542$ ns $= 64$ ns
In the transponder, the instant of triggering for the transmission of the reply signal was 64 ns too late (if a correction according to a) was made. Now, $t_g$ is again corrected by 64 ns but with opposite sign. Hence,

| $t_g$ | $= t_{g'} + 64$ ns | (correction in the transponder) |
| --- | --- | --- |
|  | $- 64$ ns | (correction in the interrogator) |
|  | $= t_{g'}$ |  |

With these two corrections, the correct value for $t_g$ is thus obtained. In contrast to the comparison with a fixed desired value or with the real value for the rise time of the pulse, it is necessary for this method of correction to be carried out both in the interrogator and in the transponder. With the other methods, too, the best correction is obtained only if the correction is performed in both stations, but worthwhile improvements are nevertheless obtained if a correction is made in only one station.

In the above calculations it was assumed that no reflections occur on the transmission path which result in a superposition of pulses (the calculations were based on unchanged rise times). If there are reflections, different correcting values are obtained in the interrogator and the transponder. The deviation from the values given under equations a and b then causes the multipath error to be corrected. This correction is superimposed on the correction explained with the aid of the equations.

The reference pulse or the reference data required for the correction can also be obtained by taking the average of the values of the received pulses and using this average for the comparison.

If the rise time is again used as the reference value, the rise time of several received composite pulses is measured, and the average of several measured rise times is used as the reference value.

It is also possible to combine several of the methods of correction described. The following is an example of such a combination. In the airborne station, the preset nominal rise time of the reply pulse transmitted by the transponder is used as a reference. The transponder is designed to produce reply pulses which lie within very close limits. To implement the comparison required for the correction, the preset nominal rise time is used. With this method of correction in the ground and airborne stations, an error results because the pulses transmitted by the airborne station do not always have the prescribed value. Since, however, the actual rise time of the pulses transmitted by the airborne station can be measured in the airborne station, this error can be calculated and taken into account during the distance measurement.

That portion of a DME interrogator in which the correction is performed will now be explained with the aid of FIG. 2. In the above-cited text by E. Kramar, the block diagram of a DME interrogator is shown on page 154. The output signal of the IF amplifier is the input signal of the portion shown in FIG. 2. This IF signal is applied to a trigger circuitry 21 and correction circuits 22. In the trigger circuitry 21, it is applied to a delay line 1 and to an attenuating device 2, which is followed by a peak detector 3. The output signals of the delay line 1 and of the peak detector 3 are fed to an amplitude comparator 4, which provides an output signal, which is the trigger signal, if the two comparator input signals are equal.

The delay of delay line 1 is chosen to be slightly longer than the rise time of the pulse. The attenuation depends on the desired threshold value. It is chosen to be 50% in the present case. The amplitude comparator thus provides a trigger signal when the pulse has attained half its maximum amplitude. A detailed description of the known circuit for determination of the *instant* the pulse attains half its maximum amplitude is known and is contained in German Pat. No. 1290605.

The trigger signal from 4 is applied to a time-measuring device 11, which also receives a start trigger signal at the instant of transmission of the interrogation signal. The first-mentioned trigger signal from 4 is the stop signal. From the measured time ($t_g$), which includes built-in equipment delays, the distance from the airborne station to the ground station is determined.

As mentioned, the IF signal is also applied to the correction circuitry 22, in which a correcting value is determined. In the present case, the reference value is the nominal rise time $t_s$ of the pulse between a first threshold value (e.g., $S1=30\%$ of the maximum pulse amplitude) and a second threshold value (e.g., $S2=70\%$). In the correction circuitry 22, the video signal is applied to a first attenuating device 5 and to a second attenuating device 7, in parallel, which are followed by peak detectors 6 and 8, respectively. The output signals of the peak detectors 6 and 8 are fed to amplitude comparators 9 and 10, respectively. The output signal of the delay line 1 is also applied as the second input signal to 9 and 10. The output signals of the amplitude comparators 9 and 10 are the start and stop signals for a time-measuring device 13. The time $t_r$ measured in the time-measuring device 13 is the rise time of the received pulse between the two aforementioned threshold values. A calculating device 12 calculates the above-mentioned values $t_{k'}$, $t_k$, and $t_b$. The nature of the circuits of 12 and 13 will be evident to the skilled practitioner based on the described inputs and desired outputs. From the corrected time $t_b$, the distance is calculated in the known manner.

In the embodiment illustrated and described, the second threshold S2 can alternatively be at 50%. The attenuating device 7, the peak detector 8, and the amplitude comparator 10 can then be dispensed with. The output signal of the amplitude comparator 4 is then also applied to the time-measuring device 13.

So far it was assumed that the correction was performed in one or both stations, i.e., the instant of triggering for the transmission of the reply signal and/or the total round-trip time of transmission was corrected. For special cases it is particularly advantageous to determine the value $t_k$ or $t_{k'}$ in the transponder and to transmit this value to the interrogator. If $t_{k'}$ is transmitted (in coded form, for example), then $t_k = M \times t_{k'}$ will be calculated in the interrogator. The total round-trip time of transmission is then calculated in the interrogator as follows:

$$t_b = t_g + t_k(\text{interrogation}) + t_k(\text{reply})$$

where $t_k$ (interrogation) = correcting value determined in the interrogator, and $t_k$ (reply) = correcting value determined in the tansponder and transmitted to the interrogator. If $t_{k'}$ was transmitted to the interrogator, then $t_k$ (reply) is the value calculated in the interrogator, i.e., $t_k$ (reply) = $M \times t_{k'}$.

It is advantageous for $t_k$ or $t_{k'}$ to be transmitted from the transponder to the interrogator with an address or synchronously with the reply signals. Attenuators 2, 5 and 7 may be referred to as first, second and third attenuators, respectively. Similarly, peak detectors 3, 6 and 8 may be respectively referred to as first, second and third peak detectors, and comparators 4, 9 and 10 may be referred to as first, second and third comparators, respectively.

What is claimed is:

1. A distance measuring equipment (DME) system comprising: an interrogator; a transponder, said interrogator and transponder each including cooperating transceivers to measure the distance from said interrogator to said transponder, said interrogator including first means for producing a first signal proportional to the time elapsed $t_g$ between a start trigger and a first invariant percent of the leading edge of a received pulse; second means for producing a second signal proportional to the time elapsed $t_r$ between the occurrence of second and third different invariant percents of the leading edge of a received pulse, said second and third percents being respectively smaller and larger than said first percent, respectively; and third means for producing an output signal proportional to a time $t_b$ which is, in turn, proportional to the distance between said interrogator and said transponder, where $$t_b = t_g + t_k$$

$$t_k = M(t_s - t_r)$$

M is a constant, and $t_s$ is a constant.

* * * * *